(No Model.) 3 Sheets—Sheet 1.
J. D. COHN.
SEAT AND SEAT COVER FOR WATER CLOSETS.
No. 457,809. Patented Aug. 18, 1891.
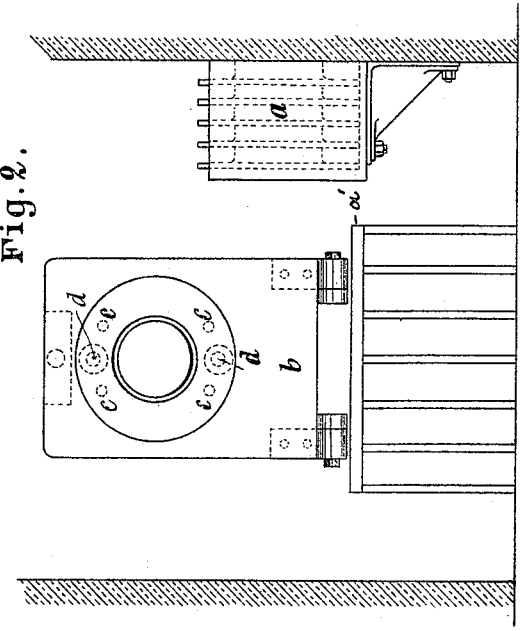
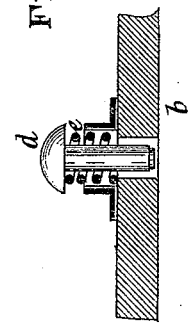
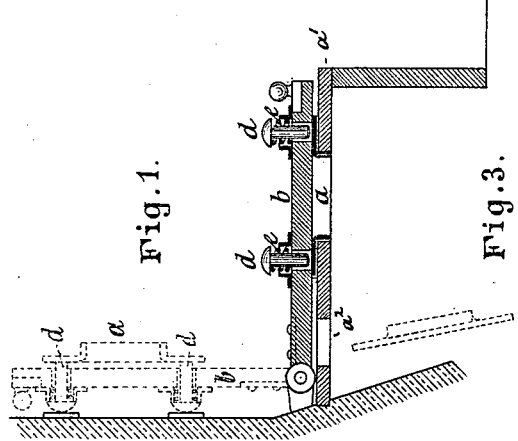
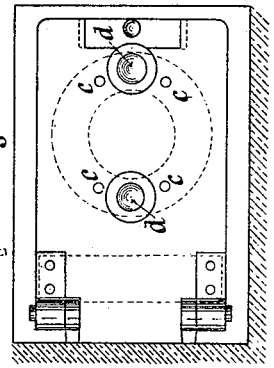
Witnesses:
T. Coan.
A. Boughman.
Inventor:
J. D. Cohn
by his attorneys
Roeder & Briesen

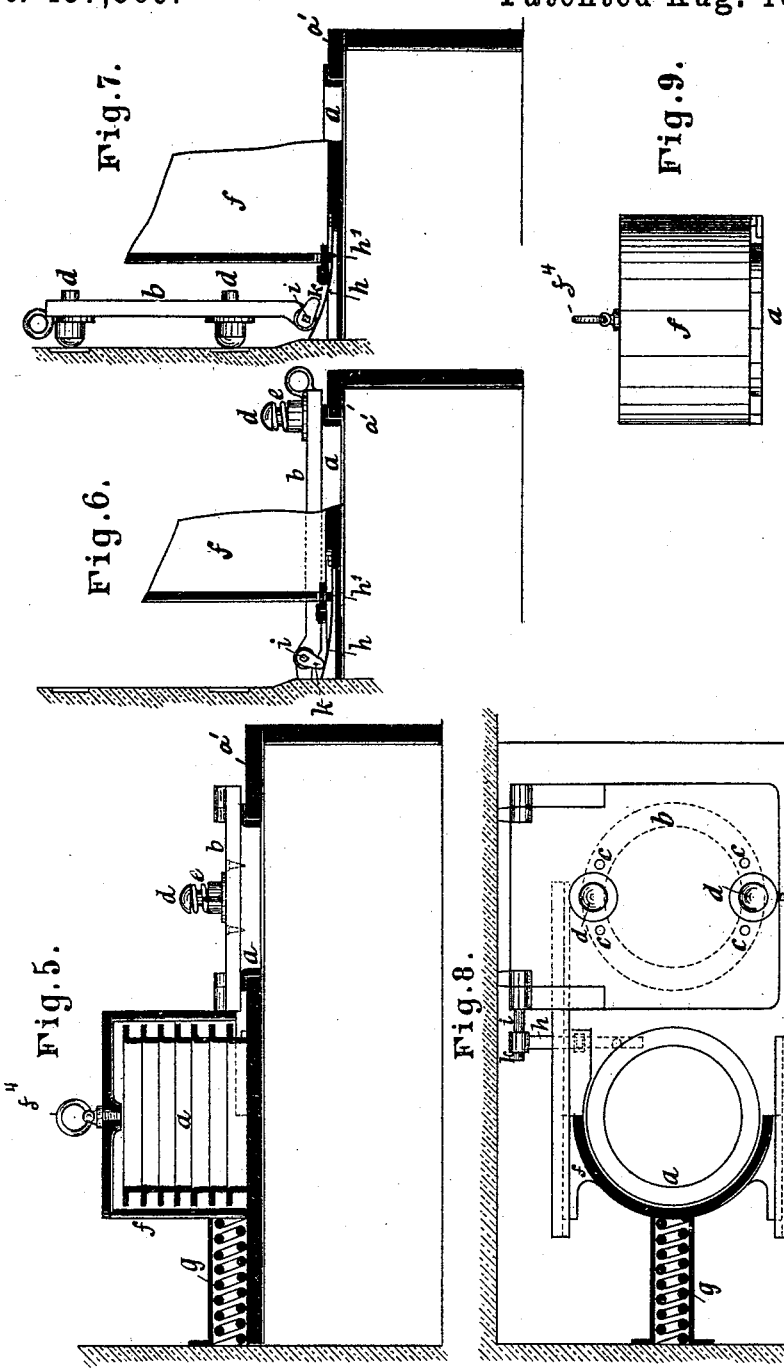

(No Model.) 3 Sheets—Sheet 3.
J. D. COHN.
SEAT AND SEAT COVER FOR WATER CLOSETS.
No. 457,809. Patented Aug. 18, 1891.
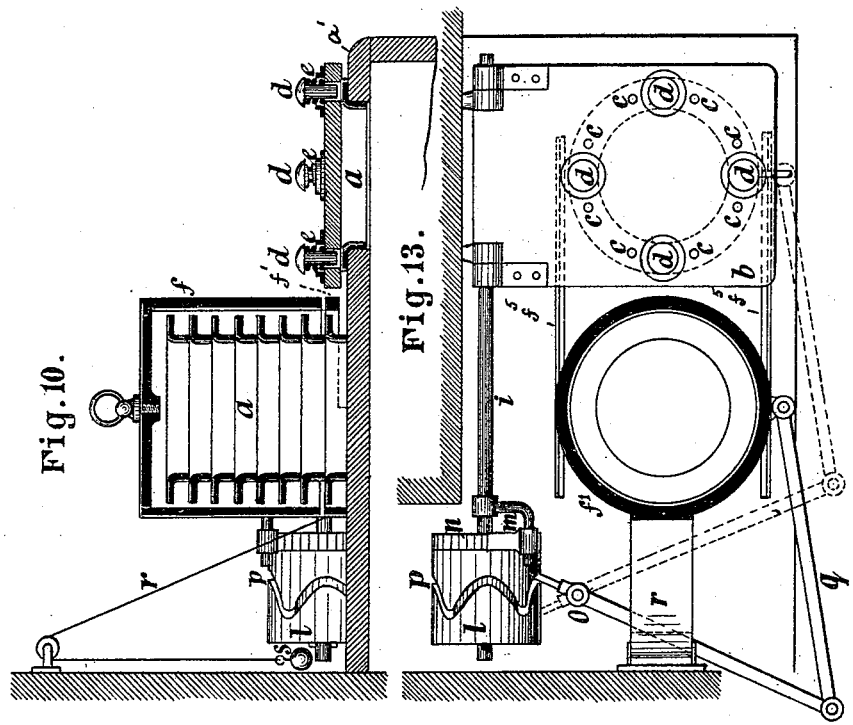
Witnesses:
T. Coan.
A. Joughmans.
Inventor,
J. D. Cohn
by his attorneys
Roeder & Briesen

UNITED STATES PATENT OFFICE.

JULIUS DAVID COHN, OF ROTTENBURG, GERMANY.

SEAT AND SEAT-COVER FOR WATER-CLOSETS.

SPECIFICATION forming part of Letters Patent No. 457,809, dated August 18, 1891.

Application filed January 26, 1891. Serial No. 379,003. (No model.)

*To all whom it may concern:*

Be it known that I, JULIUS DAVID COHN, a subject of the German Emperor, residing at Rottenburg, in Hanover, Germany, have invented certain new and useful Improvements in Water-Closet Seats, of which the following is a specification.

This invention relates to an improved water-closet seat, by which a perforated paper sheet is automatically fed over the seat-opening and is subsequently removed therefrom. Thus the seat will at all times be covered by a new sheet.

The invention consists in the various features of improvement more fully pointed out in the claims.

In the accompanying drawings, Figure 1 is a vertical transverse section through my improved seat; Fig. 2, a face view of the lid, showing it raised and carrying the paper sheet; Fig. 3, a top view of the lid, showing it closed; Fig. 4, a detail section through one of the perforations of the lid; Fig. 5, a vertical longitudinal section through the seat, showing it provided with the movable paper-receptacle; Fig. 6, a section at right angles to Fig. 5; Fig. 7, a similar section showing the spring-catch in a different position; Fig. 8, a top view of Fig. 5; Fig. 9, a detail elevation of the receptacle $f$; Fig. 10, a vertical longitudinal section through a modification of Fig. 5; Fig. 11, an end view of the cam $l$ and receptacle $f$; Fig. 12, a section at right angles to Fig. 10; Fig. 13, a top view of Fig. 10; Fig. 14, a section through shaft $i$; and Fig. 15 a diagram of the cam-groove $p$, showing it laid out in a plane.

With particular reference to Figs. 1 to 4, the letter $a$ represents an annular sheet of papier-maché having a downwardly-bent inner flange that fits into the opening of the seat $a'$. If desired, the sheet $a$ may be impregnated by an antiseptic solution.

$b$ is the hinged lid, having pins $c$ projecting from its lower face. These pins are forced into the paper when the lid is closed and carry the paper up along with the lid as the latter is opened. Spring-bolts $d$ project through the lid and strike with their heads against the rear wall of the closet when the lid is entirely open. Thus the springs $e$ are compressed and the ends of the bolts are thrown forward to force the paper off the pins $c$. The paper thus falls down, preferably through a slot $a^2$ at the rear end of the seat and either into the closet itself or into a suitable receptacle. As the lid is closed the bolts are pushed back by springs $e$, so as to permit the pins $c$ to engage the new sheet.

In Figs. 5 to 9 the letter $f$ represents a box in which the sheets $a$ are stored up above one another ready for use. The box is placed at the side of the lid $b$, Fig. 8, against which it abuts. As soon as the lid is raised a spring $g$ pushes the box $f$ forward over the opening, so that the lowermost paper sheet is placed on such opening. The box must now be pushed back into its original position by handle $f^4$.

To prevent the paper sheet, which is partly sunk into the seat-opening, from interfering with the motion of the box, the lower edge of the box is cut away in front for half its periphery, Fig. 9. When the box is moved back, the spring $g$ is compressed, and the box is firmly held in its normal position by a pin $h'$ on a flat spring $h$, that enters a hole in the surface of the box, Figs. 7 and 8. The box is released whenever the lid is closed or only partly raised by means of a cam $k$, mounted upon the rotary axis $i$ of the lid and depressing the spring $h$ and withdrawing the pin $h'$ from the hole in the box, Fig. 6, in order to allow the latter to be moved by the spring $g$. When the lid is entirely raised, the cam has released the spring, which will then firmly hold the box in the manner above described after the latter has been pushed back by hand.

In Figs. 10 to 15 the box $f$ is provided with a semicircular drawer $f'$, which can be moved under it and is intended to receive the lowermost paper sheet. The height of this drawer is equal to the thickness of one paper sheet, and it is arranged to slide between guide-rails $f^5$ toward the opening in the seat. This is effected automatically as the lid is raised. The cam-cylinder $l$, loosely mounted upon the axis $i$ of the lid, is caused to turn therewith, when the lid is raised, by a pawl $m$, secured to the axis $i$ and engaging a ratchet $n$, secured to the cylinder. One of the two arms of a lever $o$ moves in a cam-groove $p$, formed around the cylinder, and pulls with its other arm a link $q$, that carries the drawer $f'$ and the paper over the seat-opening. The lid is about half raised when the small arm of the lever $o$ passes from one of the eight curved parts of the cam-groove $p$ into the opposite curved part. During its motion in this curved path the lever pushes the empty drawer back under the box $f$.

To prevent the paper sheets in box $f$ from sinking and impeding the return motion of the drawer, a band $r$ is secured to the rear of said drawer. This band enters the box when the drawer is moved forward and holds the remaining sheets up until the return of the drawer, when the band $r$ is withdrawn by a counter-weight $s$. When the lid $b$ is raised, the cylinder $l$ is turned by the pawl $m$ a quarter-turn and the lever $o$ has moved exactly over two curved portions of the cam-groove; but when the lid is lowered upon the seat the axis $i$ turns back without moving the cylinder $l$, while the drawer $f'$ remains likewise motionless. Each time that the lid is raised the operation recommences automatically, the used-up paper sheet that has been carried up by the lid being likewise automatically removed by means of the pins $c$ and bolts $d$, as already described.

What I claim is—

1. The combination of a water-closet seat $a'$ with a hinged closing-lid $b$, pins $c$, projecting from the lower face of the lid, and bolts $d$, passing through the lid, substantially as specified.

2. The combination of seat $a'$ with lid $b$, having pins $c$ and bolts $d$, and with a reciprocating paper-carrying box $f$, placed at the side of and abutting against the lid, substantially as specified.

3. The combination of seat $a'$ and lid $b$, having pins $c$ and bolts $d$, with a box $f$ at the side of the lid, a drawer $f'$ within the box, a cam $l$, operated by the lid, a lever $o$, engaging the cam and operating the drawer, and with a band $r$, secured to the drawer and adapted to hold up the paper in the box, substantially as specified.

In testimony whereof I hereunto sign my name, in the presence of two subscribing witnesses, this 9th day of December, 1890.

JUL. DAVID COHN.

Witnesses:
S. FLATAUR,
A. UFER.